United States Patent
Koh et al.

(10) Patent No.: US 7,103,279 B1
(45) Date of Patent: Sep. 5, 2006

(54) ARCHITECTURE FOR WIRELESS TRANSMISSION OF HIGH RATE OPTICAL SIGNALS

(75) Inventors: Christopher T. Koh, South Deerfield, MA (US); Wyley Robinson, Andover, MA (US); Myung K. Lee, South Deerfield, MA (US); Eric L. Holzman, Sunderland, MA (US); Kenneth Michael Pergola, Richmond, MA (US)

(73) Assignee: YDI Wireless, Inc., Northampton, MA (US)

( * ) Notice: Subject to any disclaimer, the term of this patent is extended or adjusted under 35 U.S.C. 154(b) by 634 days.

(21) Appl. No.: 10/196,568

(22) Filed: Jul. 15, 2002

(51) Int. Cl.
*H04B 10/00* (2006.01)

(52) U.S. Cl. .................. 398/115; 398/185; 398/205; 370/314

(58) Field of Classification Search ............... 398/115, 398/185, 205; 370/314
See application file for complete search history.

(56) References Cited

U.S. PATENT DOCUMENTS 6,480,477 B1 * 11/2002 Treadaway et al. ......... 370/314

OTHER PUBLICATIONS

Noreus, J., et al., "System Considerations for Hardware Parameters in a 60 GHz WLAN".
GigaLink Product Specification.
Loea Communications Corporation, Loea Communications Corporation Solving the "Last Mile Problem" with the "Last 10 Miles Solution" (2001).
SierraCom, "SierraCom's FiberConnection™ Series 60 Ghz Radio for US Markets," ISO-9001 Certified Facility.

* cited by examiner

*Primary Examiner*—David C. Payne
(74) *Attorney, Agent, or Firm*—Hamilton, Brook, Smith & Reynolds, P.C.

(57) ABSTRACT

An apparatus for a wireless transmission of high data rate signals such as received from an optical interface including gigabit fiber channel or a sonet. The architecture combines direct detection of the optical signal with clock and data recovery circuit and a differential signal encoder which is preferably a differential quadrature phase shift encoder and modulator pair. A millimeter wave, local oscillator and up conversion chain converts the optical input signal to a microwave carrier. In the opposite direction, the down converted signal is non-coherently phase detected and fed to a pair of synchronized clock and data recovery circuits to recover I and Q channel signals. These recovered signals are then combined prior to re-timing before they are fed back to the optical transceiver.

28 Claims, 10 Drawing Sheets

DQPSK ENCODER TRUTH TABLE — 1400

| CURRENT INPUT | | $\lambda\phi$ | LAST OUTPUT | | CURRENT OUTPUT | |
|---|---|---|---|---|---|---|
| Ai | Bi | | $\alpha i\text{-}1$ | $\beta i\text{-}1$ | $\alpha i$ | $\beta i$ |
| 1 | 1 | 180 | 1 | 1 | 0 | 0 |
| 0 | 1 | 0 | 1 | 1 | 1 | 1 |
| 1 | 0 | 90 | 1 | 1 | 0 | 1 |
| 0 | 0 | -90 | 1 | 1 | 1 | 0 |
| 1 | 1 | 180 | 0 | 1 | 1 | 0 |
| 0 | 1 | 0 | 0 | 1 | 0 | 1 |
| 1 | 0 | 90 | 0 | 1 | 0 | 0 |
| 0 | 0 | -90 | 0 | 1 | 1 | 1 |
| 1 | 1 | 180 | 1 | 0 | 0 | 1 |
| 0 | 1 | 0 | 1 | 0 | 1 | 0 |
| 1 | 0 | 90 | 1 | 0 | 1 | 1 |
| 0 | 0 | -90 | 1 | 0 | 0 | 0 |
| 1 | 1 | 180 | 0 | 0 | 1 | 1 |
| 0 | 1 | 0 | 0 | 0 | 0 | 0 |
| 1 | 0 | 90 | 0 | 0 | 1 | 0 |
| 0 | 0 | -90 | 0 | 0 | 0 | 1 |

$ai = Bi(Ai \oplus a(i\text{-}1)) + \overline{Bi}(A \oplus b(i\text{-}1))$
$bi = Bi(Ai \oplus b(i\text{-}1)) + \overline{Bi}(A \oplus a(i\text{-}1))$

PHASE SHIFT ASSIGNMENT

| Ai | Bi | $\lambda\phi$ |
|---|---|---|
| 1 | 1 | 180 |
| 0 | 1 | 0 |
| 1 | 0 | 90 |
| 0 | 0 | -90 |

OUTPUT SYMBOL ASSIGNMENT — 1420

ARCHITECTURE FOR WIRELESS TRANSMISSION OF HIGH RATE OPTICAL SIGNALS

BACKGROUND OF THE INVENTION

Point to point, fixed, wireless signaling technologies that operate in unlicensed microwave radio frequency bands have recently received increased attention. From a regulatory perspective, the radio spectrum at 40 GigaHertz (GHz) and above is relatively interference-free. The ability to form very narrow radiation beams at these frequencies with physically small apertures also minimizes interference between adjacent users.

These technologies are expected to enable high speed, low cost access to data networks in remote locations as well as in urban and metropolitan areas. Because of the inherent broadband nature of these connections, they may be typically used to facilitate other high speed services, such as video on demand. Equipment operating in this band is also expected to be applied to backhaul or aggregation of secondary networks such as lower frequency wireless networks, Local Multipoint Distribution Service (LMDS), cable facilities, cellular telephone tower interconnection networks, and the like.

SUMMARY OF THE INVENTION

It would be desirable to provide a device that would allow high data rate, wired signals such as digital optical signals to be transported as easily as possible over wireless links such as those that use microwave, point to point radio technologies. In practice, the required operating parameters for such a device have been relatively difficult to achieve. Performance criteria of interest include amplifier linearity, close control over output power, noise figure oscillator phase noise and mixer conversion loss. Unfortunately, existing designs are relatively limited in their ability to meet all of these performance criteria at reasonable cost.

The present invention is directed to a microwave subsystem that includes an electrical converter for converting a received optical signal containing a high data rate signal. A clock and data recovery circuit is used for recovering the high data rate signal from the converted electrical signal. An encoder processes the required signal to produce an encoded electrical signal. A symbol modulator then modulates the encoded electrical signal in an appropriate form at an Intermediate Frequency (IF). An up-converter then converts the IF signal to a microwave frequency carrier.

This approach provides several advantages over prior art systems. Most significantly, there is no processing of baseband protocol information in the received optical signal—only the raw data rate signal is extracted. Thus, the extracted signal may retain its modulation encoding such as Code Division Multiple Access (CDMA), Time Division Multiple Access (TDMA), or other carrier network specific protocol encoding. The converter will therefore work appropriately regardless of how the input data stream was encoded. The synchronous data stream of any protocol can therefore be detected, even those that use proprietary protocol encoding. The radio transmission is therefore accomplished without knowledge of the format of the particular incoming signal.

In accordance with more detailed aspects of one preferred embodiment of the present invention, a Synchronous Optical Network (SONET) signal is received by an optical transceiver and converted to an electrical signal. A clock and data recovery circuit recovers the data clock from the serial bit stream in the electrical signal. The serial bit stream is then re-clocked off the recovered data clock before being passed on to the following circuitry. A differential encoder then encodes every two state changes of the serial bit stream into two bit streams running at half the original clock rate. The two bit streams make up each half of four distinct logical states called symbols.

A Quadrature Phase Shift Keying (QPSK) modulator then modulates each symbol as a phase state in a microwave oscillator output. After the QPSK signal has been encoded and modulated in this fashion, it is then filtered to minimize its output bandwidth. This filter, when combined with other output Radio Frequency (RF) filters, has as a preferred cosine roll-off over frequency. By filtering out low frequencies relative to the ultimate output microwave carrier frequency, the percent bandwidth of the filter passband is maximized. The group delay of the filters in the chain should also be minimized to reduce intersymbol interference.

Once the signal is filtered, it is up-converted to a microwave carrier in the V-band using a fundamental mixer. A fundamental mixer frequency output filter is then used to reject the local oscillator image or any other image frequencies. A Monolithic Microwave Integrated Circuit (MMIC) amplifier can boost the power level of the resulting signal, before it is fed to an output diplexer.

The signal is then directed to another companion unit at the end of the point to point link using a high gain antenna.

The companion unit receives the radiated microwave signal from the transmitting unit, passing it through the receiver side of the diplexer into a Low Noise Amplifier (LNA). The LNA output is then fed to an image reject filter. A mixer, which may be a harmonic mixer, is used to convert the received signal to a lower frequency (IF) signal. The receiver filter can also preferably be implemented with a cosine roll-off to minimize intersymbol interference.

After IF filtering, the received signal is demodulated by a noncoherent differential QPSK demodulator to recover the transmitted bit stream. Demodulation of in-phase (I) information is accomplished by delaying the received signal by one symbol minus 45 degrees and then mixing it with the undelayed received signal. The quadrature phase (Q) information is recovered by delaying the received signal by one symbol plus 45 degrees and then mixing it with the undelayed received signal. This noncoherent method of demodulation recovers both I and Q components of the transmitted signal without having to recover the carrier of the modulated signal, and without introducing ambiguities. By avoiding carrier recovery, this demodulator is therefore tolerant to frequency offset and phase noise from the transmitter modulated carrier, as well as from the V-band local oscillator used for up-conversion in the transmitter and down conversion in the receiver.

The outputs of the demodulator are then low-pass filtered to derive voltages proportional to the differential phase. This signal is fed to two additional Clock and Data Recovery Circuits (CDRs). This pair of CDRs recovers the binary data by data clock and adapted decision thresholding. The resulting pair of I and Q binary bit streams are then combined to complete the recovery of the original bit stream. The bit stream may then be reconverted to the optical carrier as desired.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
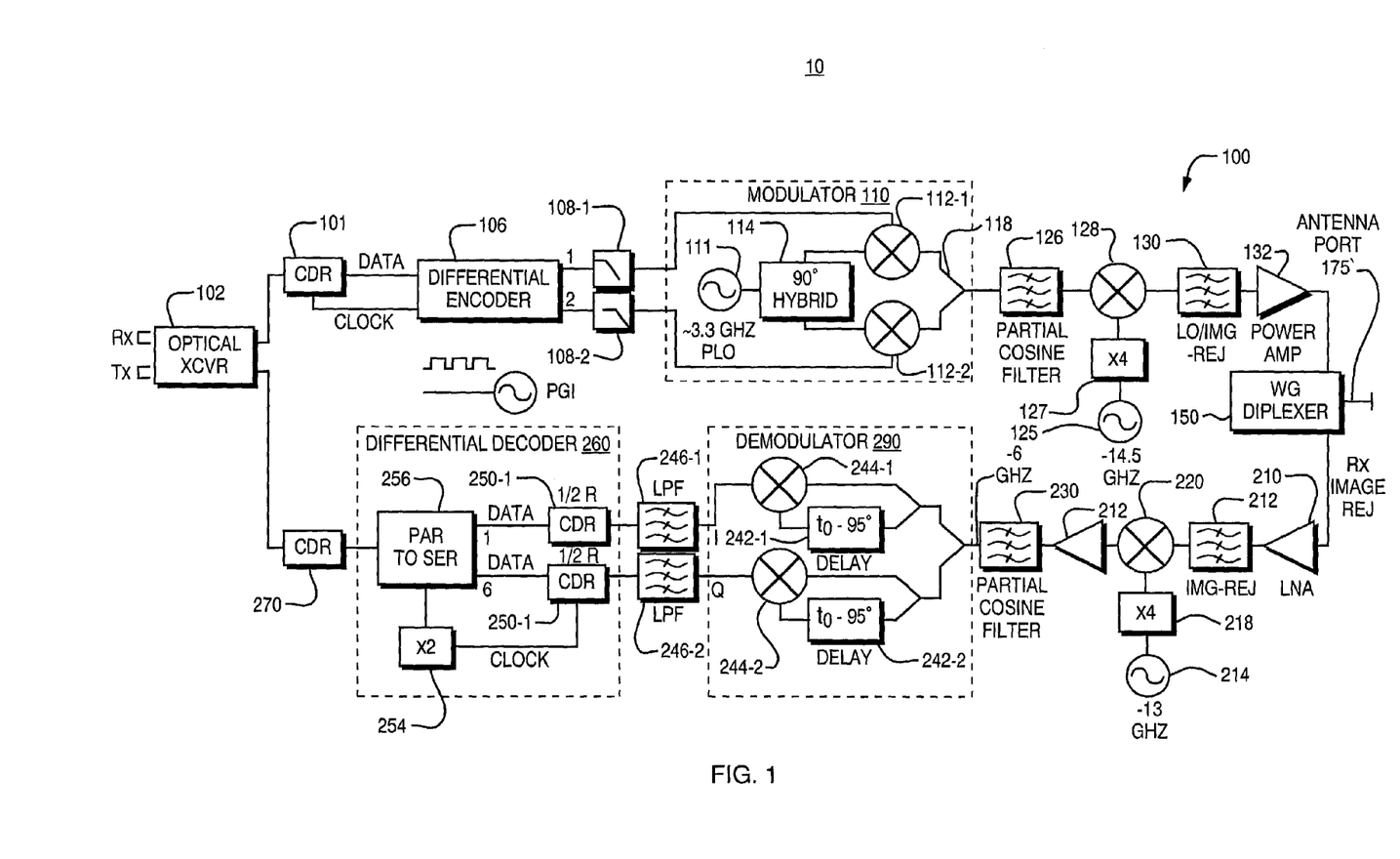
FIG. 1 is a block diagram of a signal converter according to the invention.

FIG. 1 is a block diagram of an optical to wireless microwave signal converter 10 according to the invention. The converter 10 includes an optical to electrical or microwave transmitter portion 100 and an electrical to optical or microwave receiver portion 200. It should be understood that in a typical point to point system, there will be two converters 10, each associated with one of two end points of a communication link.

The microwave transmitter portion 100 uses an optical transceiver 102 to receive an input optical signal. The optical signal is a high data rate protocol encoded signal such as a SONET signal. It should be understood that other types of optical transport signals such as Gigabit Ethernet (GE) signals may be converted to microwave signals using the principles of the present invention. The optical transceiver converts the optical signal to an electric signal, which in turn is fed to a Clock and Data Recovery (CDR) circuit 104. The CDR 104 provides a Data signal and a Clock signal to a differential encoder 106.

Figure 2:
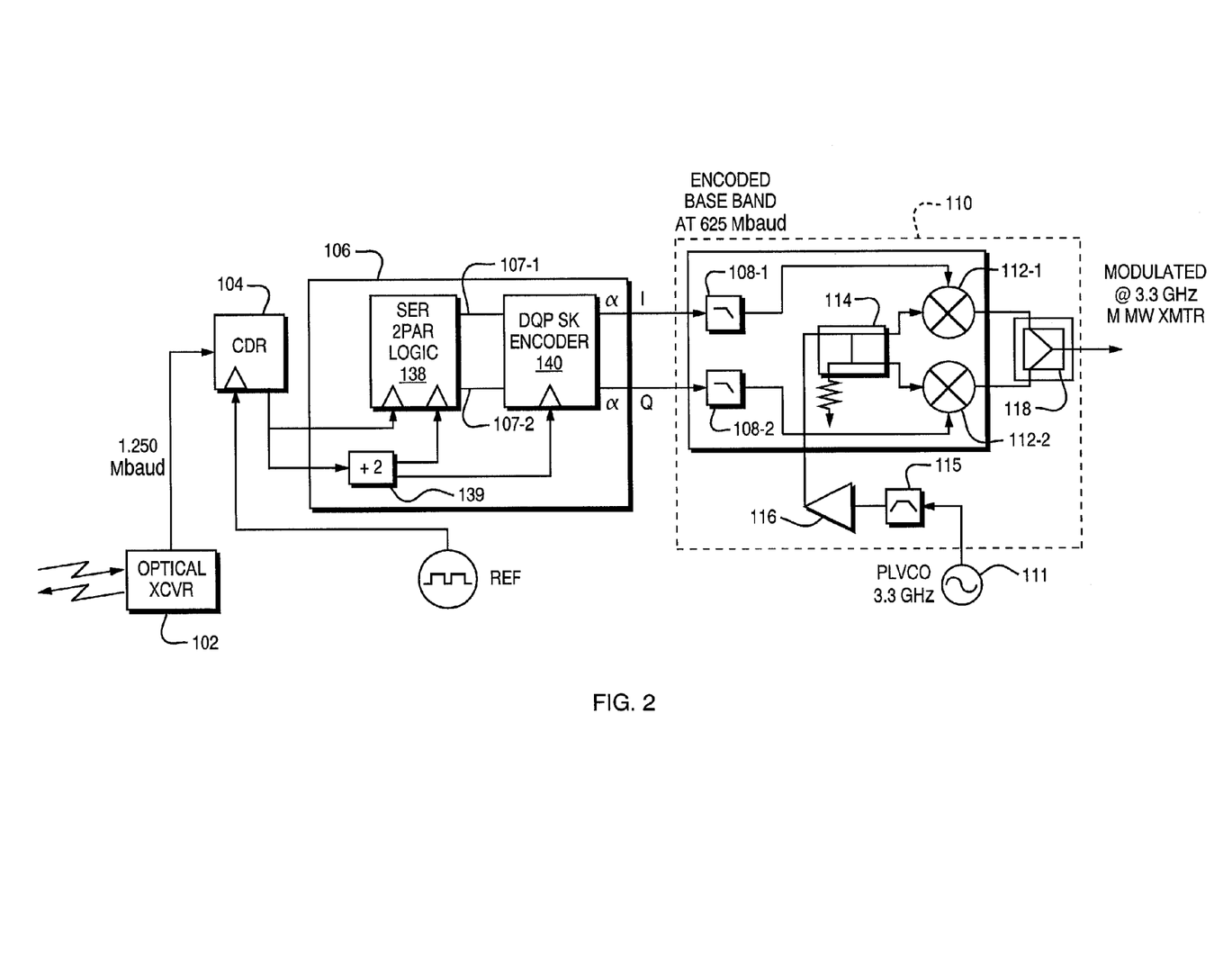
FIG. 2 is a more detailed diagram of the modulation chain in an optical to electrical or transmitter portion.

The differential encoder 106, which will be described in greater detail in connection with FIG. 2, provides a pair of output signals to a respective pair of low pass filters 108-1 and 108-2. It suffices here to say that the differential encoder 106 encodes the signal on a symbol by symbol basis, two bits at a time. The information is preferably encoded differentially for input to a Quadrature Phase Shift Keying (QPSK) modulator. This type of encoding requires the differential encoder 106 to retain knowledge of the last output signal as well as having access to the present input signal. The resulting in-phase (I) and quadrature (Q) bit streams provided to the filters 108-1 and 108-2 thus represent an encoded phase change. The output of the encoder is a pair of parallel bit streams at one-half the input data rate.

A QPSK modulator 110 uses the I and Q bit streams to modulate a local oscillator. Specifically, the modulator 110 thus consists of a local oscillator 111, a 90-degree hybrid 114, and output mixers 112-1 and 112-2. The QPSK modulator 110 takes the encoded I and Q signals from filters 108, up-converts them to a quadrature modulated output signal at the output of combiner 118. The QPSK modulator provides an output signal at an Intermediate Frequency (IF) such as 3.3 GHz.

The resulting quadrature modulated signal is fed to a microwave frequency RF chain consisting of a partial raised cosine bandpass filter 126, an up-converter oscillator, and mixer chain, including local microwave oscillator 125, frequency multiplier 127, and up-converter mixer 128. The output of up-converter mixer 128 is a signal in the 60 GHz or V-band range. This signal feeds a final LO and image reject filter 130 and output power amplifier 132. The transmit signal is then fed through the transmit portion of a waveguide diplexer 150 to an antenna port 175.

A microwave receiver portion 200 operates on microwave signals received at the antenna port 175. A receive portion of the diplexer 150 feeds a low noise amplifier 210. An image reject filter 212 removes undesirable sidebands feeding a down-converter mixer chain including a local oscillator 214, multiplier 218, and down-converter mixer 220. A receiver amplifier 224 feeds a partial raised cosine filter 230. This provides a signal at approximately a 6 GHz frequency to a non-coherent DQPSK demodulator 240.

The DQSPK demodulator 240 (discussed in greater detail below) consists of a pair of delay units 242-1 and 242-2 that provide a minus 45° and plus 45° delay, respectively. The received signals are then demodulated with the mixers 244-1 and 244-2, respectively, to provide an in phase (I) and quadrature (Q) representation. Passing through respective low pass filters 246-1 and 246-2, the I and Q signals are then fed to a pair of CDR circuits 250-1 and 250-2. These CDR circuits, operating at one half of the original digital bit stream rate, provide resulting I and Q data streams to a parallel to serial converter 256. A selected one of the CDRs 250-1 or 250-2 is then used as a clock reference to drive the parallel to serial converter 256. The resulting output of the differential decoder 260 is then fed to a final CDR circuit 270 to further re-time the digital bit stream prior to being fed to the transmit portion of the optical transceiver 102.

With further reference to the demodulator 240, the delay elements 242-1 and 242-2 may be provided by a transmission line with a length set to delay the signal by one symbol period. For example, if the input signal is a Gigabit Ethernet (GigE) type signal and the bit rate is 1.25 Gigabits per second (Gbps), the transmitted symbol rate output by the differential encoder is 0.625 Gbps, and the symbol period is therefore 1.6 nanoseconds (ns). For an OC-12 rate signal the bit rate is 0.622 Gbps, and the transmitted symbol rate is 0.311 Gbps and the symbol period is 3.215 ns. FIG. 2 shows the modulation chain in more detail. In particular, the differential encoder 106 is seen to include a serial to parallel logic circuit 138, a differential encoder circuit 140, and a divide-by-two clock circuit 139. The divide by two clock circuit 139 provides a clock reference for the serial to parallel logic, that provides two output streams 107-1 and 107-2 by de-interleaving the input serial bit stream from the optical transceiver For example, in a Gigabit Ethernet application where input data stream is at 1.25 Gigabits per second (Gbps), the resulting two bit streams are at 0.625 Gbps.

Figure 3:
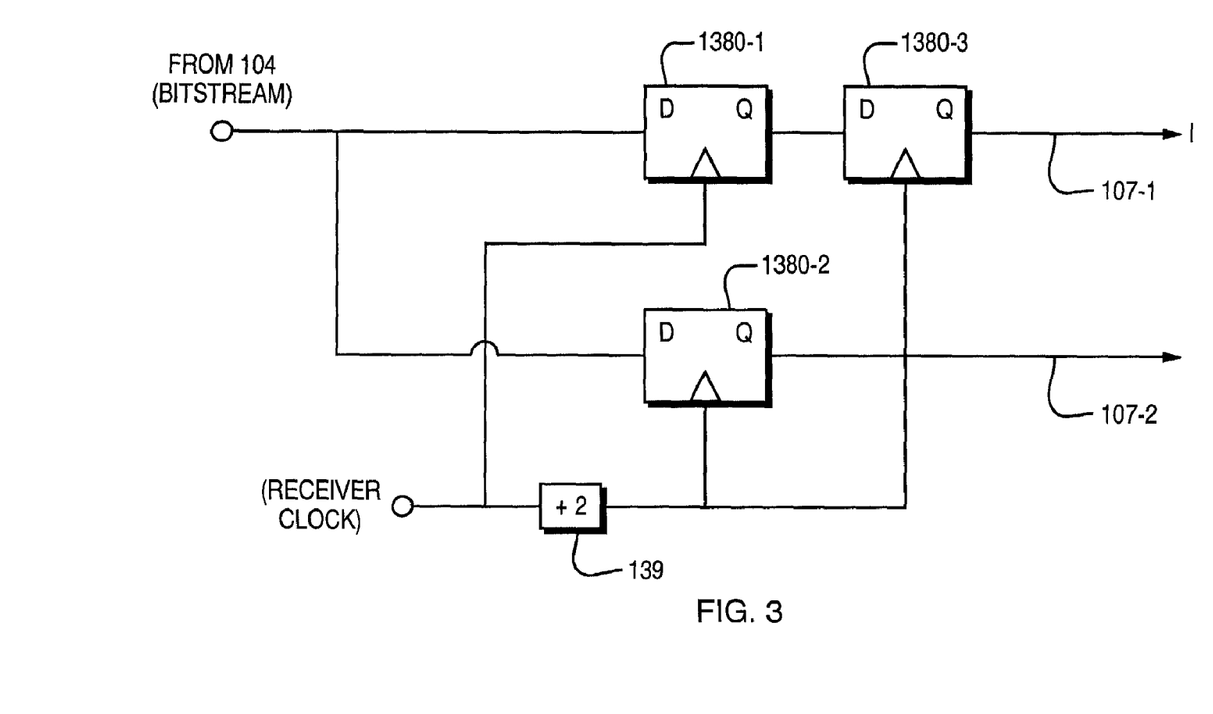
FIG. 3 is a logic circuit diagram for a serial to parallel converter in the modulation chain.

The serial-to-parallel logic 138 is shown in FIG. 3; it consists of three D-type flip-flops, 1380-1, 1380-2, and 1380-3. By using one-half rate of the bit clock, the flip-flop 1380-2 clocks out every odd numbered incoming bit at one-half the bit rate. After one bit period delay through 1380-1, the flip-flop 1380-3 clocks out every even numbered incoming bit at half the bit rate. The resulting two I and Q bit streams arrive at the modulator 110 at the same time representing a data symbol as a two-bit pair.

Figure 4:
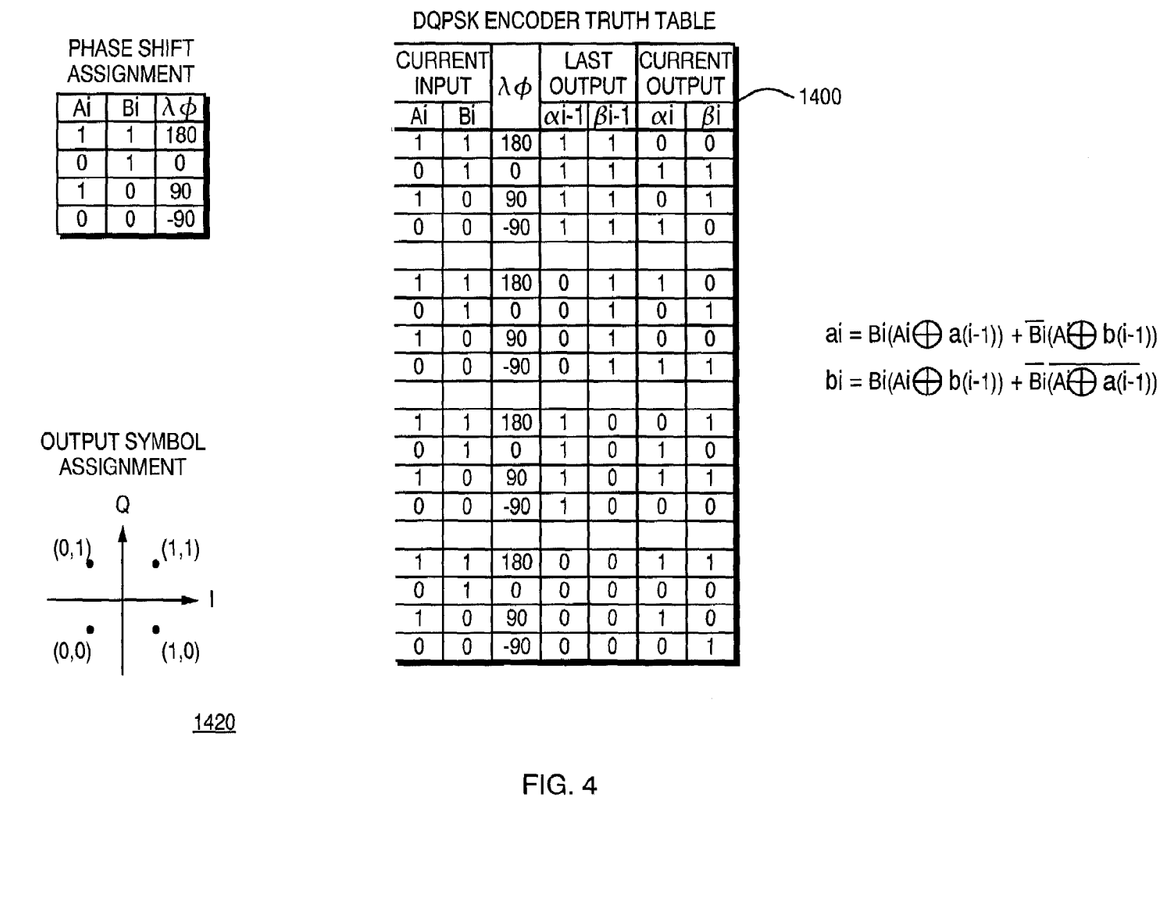
FIG. 4 is a true table for a Differential Quadrature Phase Shift Keying (DQPSK) encoder.
Figure 5:
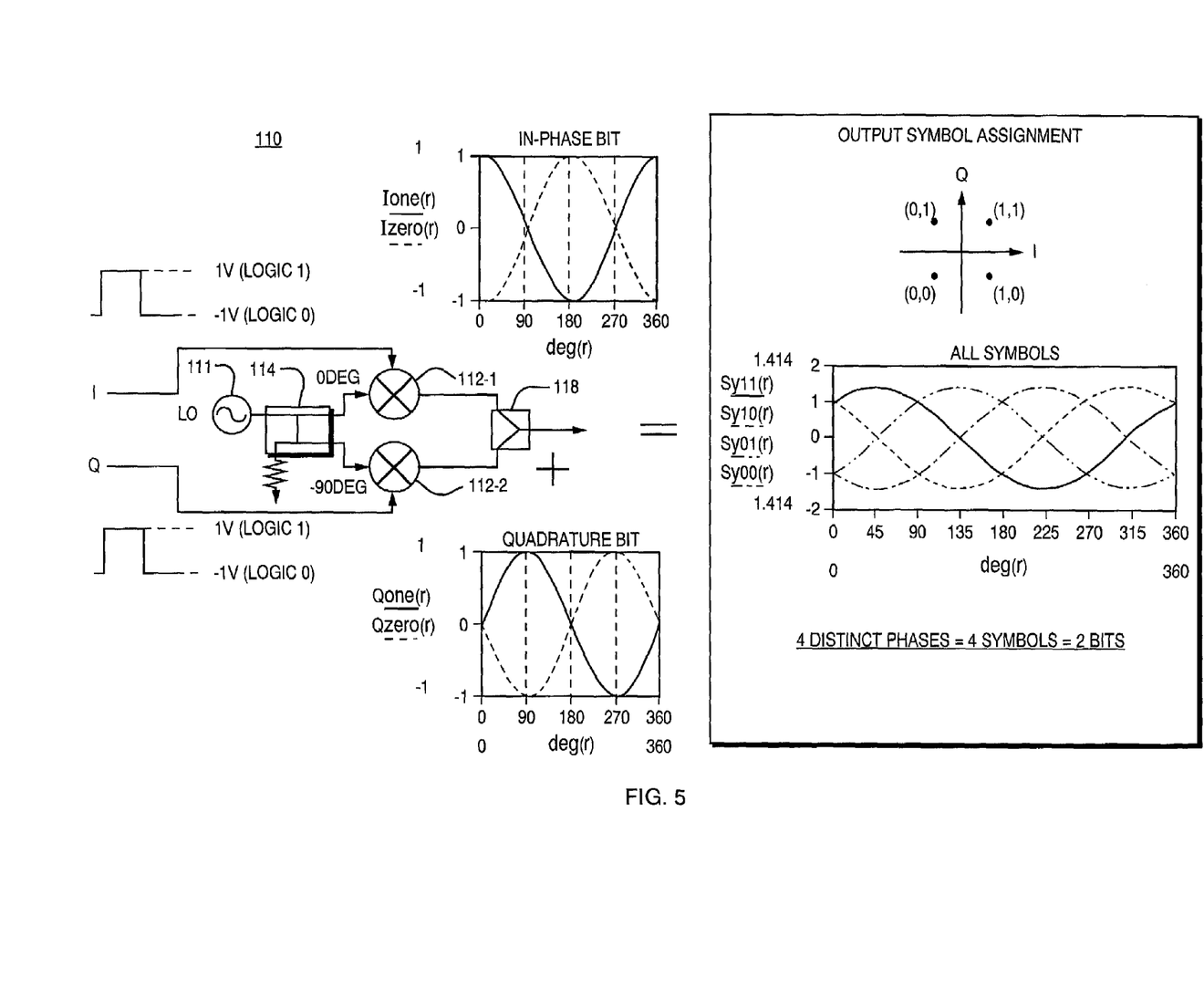
FIG. 5 illustrates QPSK modulation.
Figure 6:
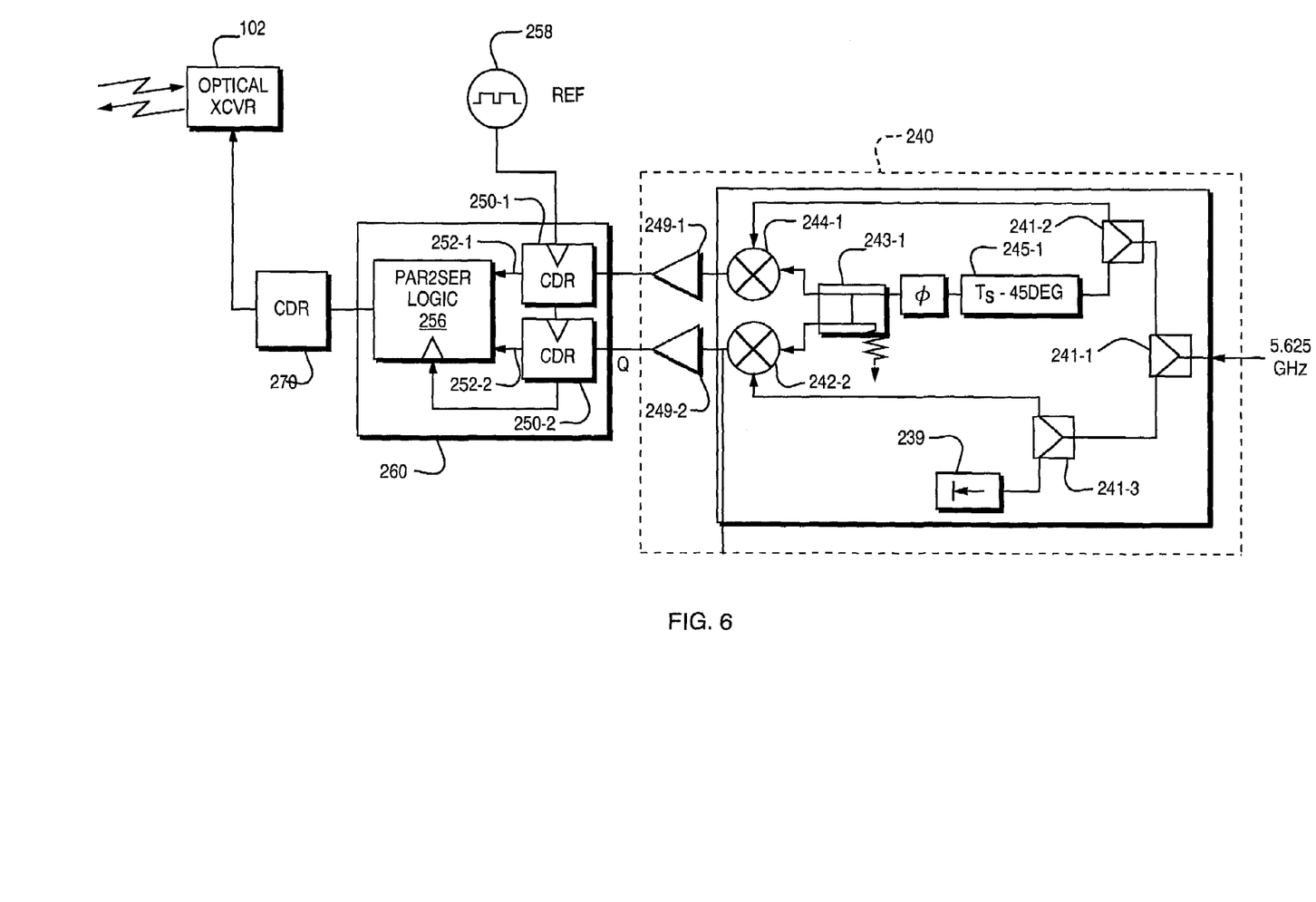
FIG. 6 is a more detailed diagram of the demodulation chain in the electrical to optical or receiver position.

A logic table diagram 1400 for the 2-bit differential encoder is shown in FIG. 4. This logic table 1400, as previously mentioned, is for a differential type encoder that requires both a current input symbol and last output symbol in order to determine a current output symbol. Current output bits $\alpha_1$, and $\beta_i$ are shown on the right hand side of the chart. These respectively provide the in-phase (I) and quadrature (Q) outputs of the encoder 106. The output symbol assignment is thus shown in the phase diagram 1420 where an output symbol pair of (1,1) is translated by the modulator to a phase shift of 45°, a symbol pair of (0,1) is an output phase shift of +135°, a symbol pair of (0,0) is a phase of −135°, and a symbol pair of (1,0) is a phase of −45°. As shown more particularly in FIG. 5, this permits the quadrature modulator 110 to provide the desired output for distinct phases representing two-bit combinations as shown. FIG. 6 shows a more detailed view of the non-coherent DQPSK demodulator 240 and associated parallel to serial logic 260. The input signal, for example, at an IF of 5.625 GHz, is split by power divider 241-1 to two paths through a further pair of splitters 241-2 and 241-3. These outputs are fed to drive mixer pairs 244-1 and 244-2. The other input to the mixer pair are the quadrature signals derived from the delay line 245-1 and hybrid circuit 243-1. The resulting outputs from the amplifiers 249-1 and 249-2 are an I and Q signal pair, at a half the desired data rate, having been down-converted from the 5.625 GHz IF.

The pair of CDR circuits 250-1 and 250-2 then operate on each of the respective I and Q signal paths. These circuits recover the bit clock from I 251-1 and Q 252-1 signals in cleaner digital form. The parallel to serial logic 256 combines the two baseband bit streams back to a single bit stream 254 prior to its being fed to the final CDR circuit 270. At this point, the original bit stream at the full data rate is recovered. This final CDR circuit 270 provides for further synchronization of the output bit stream before being fed to the optical transceiver 102.

Figure 7:
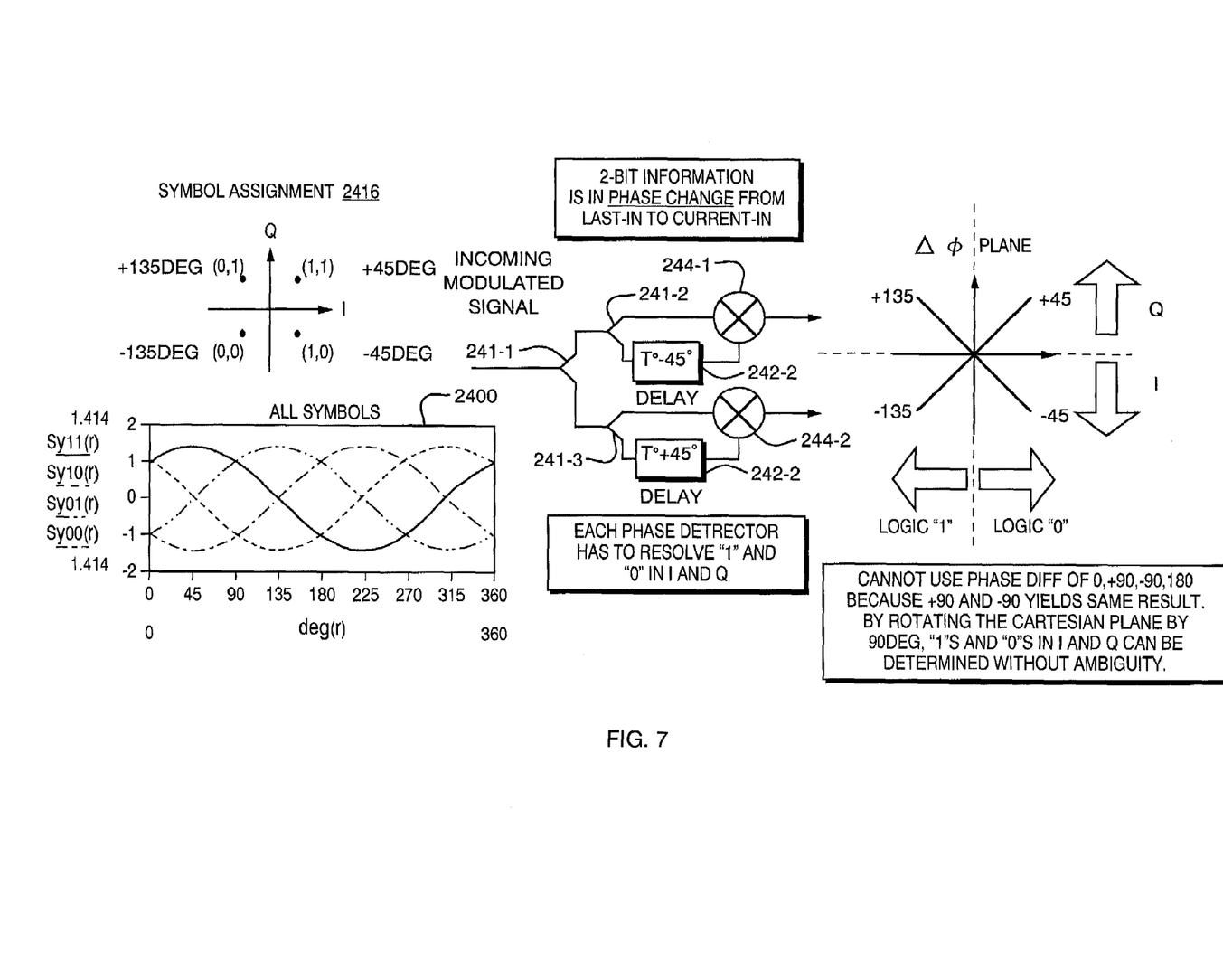
FIG. 7 illustrates the operation of a DQPSK demodulator.

FIG. 7 is a more detailed view of the operation of the DQPSK demodulator 240. In particular, the incoming signal is fed to the signal splitters and delays 242 and mixers 244-1 and 244-2 to provide in-phase and quadrature signals. The input symbol assignment, shown in the phasor diagram 2410, corresponds to the transmit symbol assignment as previously described. Because each phase detector must resolve both 1 and 0 in I and Q independently, it is not possible to use phase differences of 0, +90, −90 and 180 because phase differences of +90 and −90 produce the same result in certain bit sequence combinations. However, by rotating the Cartesian plane by 45 degrees, zeros and ones in the I and Q can be determined without ambiguity. It is therefore, in a preferred embodiment, necessary to have the symbol assignments as shown, with the phasor values set for ±45° and ±135°.

Figure 8:
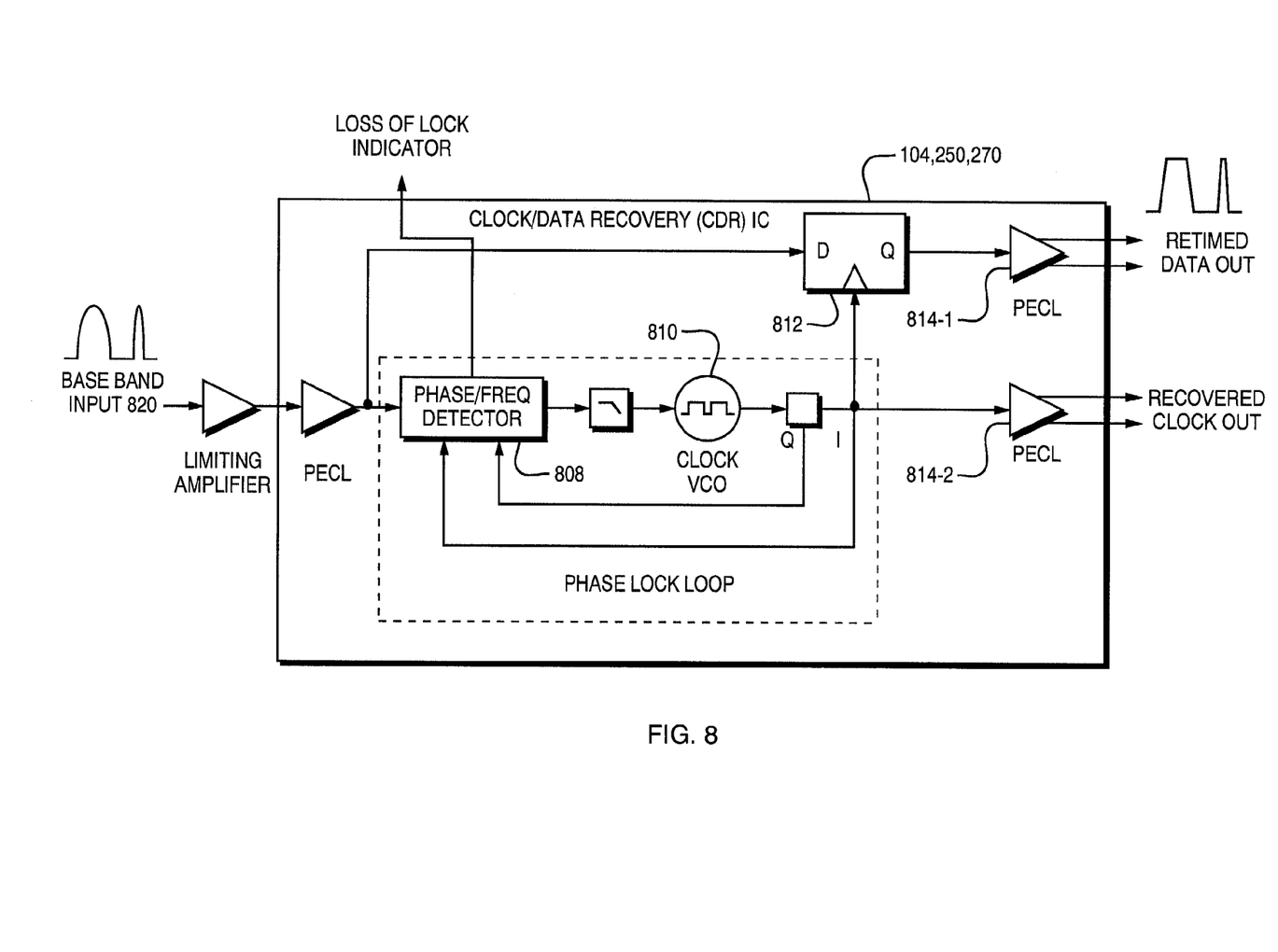
FIG. 8 is a more detailed diagram of a typical embodiment of the clock and data recovery circuit.

Finally, FIG. 8 is a detailed view of a typical embodiment of the clock and data recovery circuit 104 used on the transmit side as well as circuits 250-1, 250-2 and 270 used on the receiver side. The CDR circuit may be the model SY87701L available from Micrel Corporation. This chip is a clock and data recovery integrated circuit that operates with data rates from 32 megabits per second up to 1.25 gigabits per second. Clock and data timing recovery is performed by synchronizing an on-chip, Voltage Controlled Oscillator (VCO) 810 directly to an incoming data stream 820, through the use of a phase lock loop 808. Flip-flop 812 and drivers 814-1 and 814-2 provide the retimed data and recovered clock outputs.

The pair of timing recovery circuits 250 reduces the need for precise timing relative to the transmitter. This also provides a number of advantages. In particular, since the clock and data recovery circuits 250 are relatively inexpensive, two CDR circuits can be used, with each one operating at one-half the data rate.

Also, if the I and Q half-rate bit streams are not recovered independently, it might be expected to be somewhat difficult to line them up after demodulation. By using the two CDRs that are synchronized to one another, that is, to the same local clock reference, the demodulated and retimed half-rate bit streams will be in phase allowing accurate reconstruction of the original bit stream. Also, by avoiding higher decoding layer protocol in the differential decoder and QPSK modulator, the conversion circuit 10 may process optical signals of different types regardless of how they are coded. In particular, the microwave radio signal is modulated without need for knowledge of the baseband formatting of the incoming optical signal or the protocol used to encode that data stream. Thus, higher layer protocol operations need not be performed on the incoming optical signal prior to its up conversion to a microwave signal carrier. The resulting radio design is independent of the protocol used to encode the data at layers above the physical layer. Any bit rate signal within range of the clock and data recovery units can be processed, and properly up-converted by the transmit chain 100 and down-converted by the receive chain 200.

Figure 9:
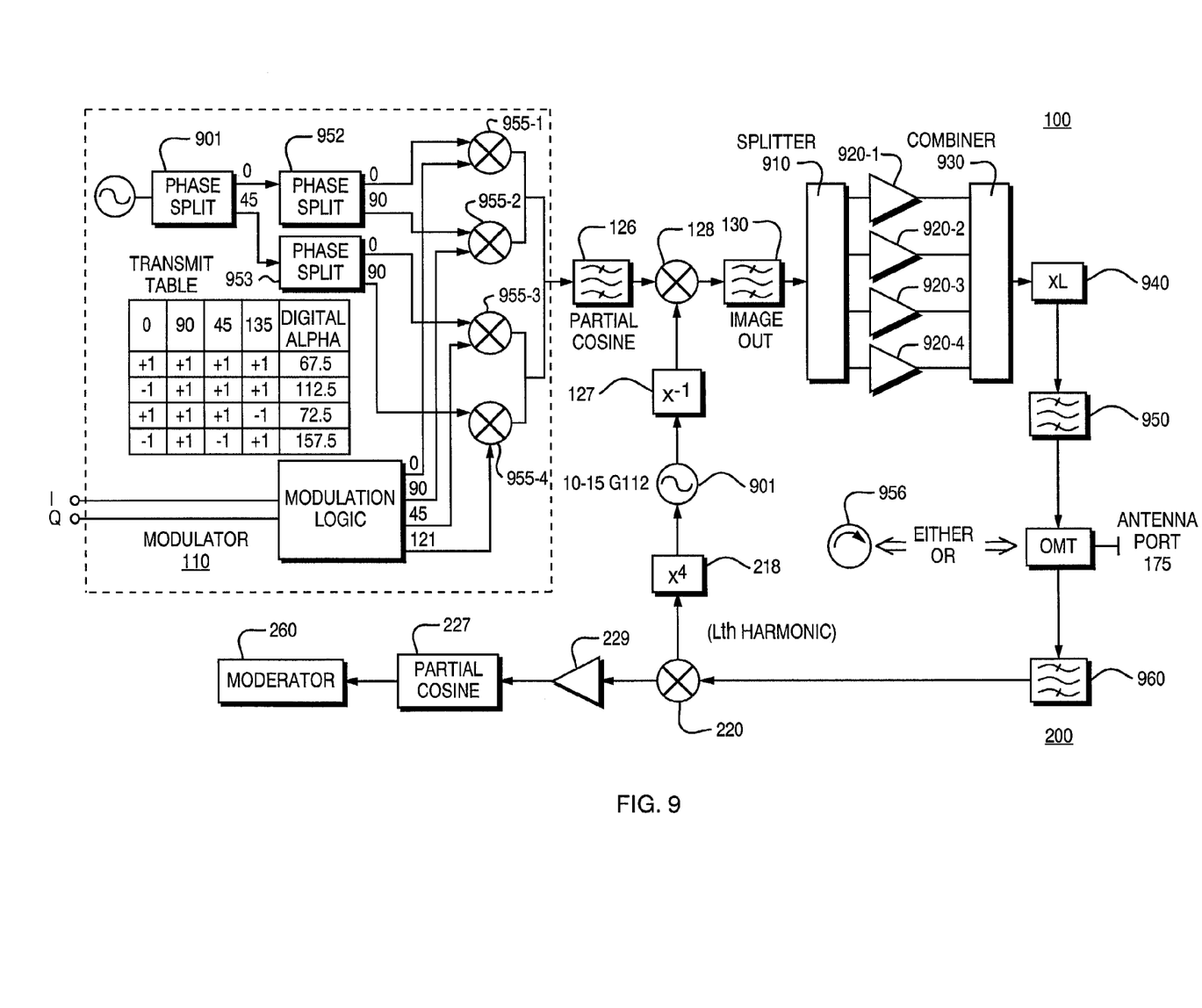
FIG. 9 is a block diagram showing alternate embodiments of the radio frequency portion of the transmitter and receiver.

FIG. 9 is a block diagram of certain portions of microwave transmitter 100 and receiver 200 illustrating alternate arrangements for various elements. These include (a) a common local oscillator for the transmitter 100 and receiver 200; (b) extending the microwave frequency range with an output multiplier and appropriate adjustment to the phase shifter; (c) an Ortho-Mode Transducer (OMT) or circulator in conjunction with filters in place of the frequency diplexer; and/or (d) multiple MMIC power amplifiers. It should be understood that each of these approaches may be used independently or in combination with one another as design alternatives.

For example, in one case shown in FIG. 9, a single local oscillator 901 is operating in the range of from 10 to 15 GHz. In this instance the IF frequency provided by the output of the modulator and at the input to the demodulator 260 would be the same. The single local oscillator 901 thus can serve both the transmitter portion 100 and receiver portion 200.

The output frequency range for the microwave carrier signals can also be extended through the use of a final stage frequency multiplier 940. In general, the multiplier 940 is a times L frequency multiplier, where L is an integer such as 2 or 4. The frequency multiplier 940 is inserted in the output RF chain such as before the final filter 950. The multiplier 940 allows for use of higher range microwave carrier frequencies than might otherwise be possible.

The phase states are adjusted depending upon the multiplication factor, L. In a case where L=2, the modulator 110 generates four phase states using phase splitters 951, 952, 953 and summers 955-1, 955-2, 955-3, 955-4, as shown. By summing the proper phase (45, −45, 135, or −135) from the sum of the upper two mixers 955-1, 955-2, with the proper phase (0, 90, 180, or −90) from the sum of the lower two mixers 955-3, 955-4, the desired 22.5, 67.5, 112.5, and 157.5 degree phases are created. The logic table shows the mapping from data to the inputs to the four mixers used as 180 degree phase shifters.

Note that in an instance where the output multiplier 940 is utilized the output frequency range may be such that a low noise amplifier 210 used in the embodiment of FIG. 1 is not needed. Specifically, because of the higher microwave frequencies involved, it may not be possible to use amplifiers that have acceptable noise performance. In this instance, a harmonic mixer 220 might be used in the receiver 200 to recover the microwave signal of interest. In the case where the frequency multiplier 940 factor, L, is two, the harmonic mixer 220 should be a second harmonic mixer.

Additional embodiments may include the introduction of multiple amplifiers 920 in the output transmit stage to boost the total output power. In the illustrated embodiment, there are four such amplifiers 920-1, 920-2, 920-3, and 920-4. The amplifiers 920 are fed by appropriate splitter 910 (or network of splitters) and combined at their outputs by an appropriate combiner 930 and/or combiner network.

In addition, the diplexer 150 of the FIG. 1 embodiment might be replaced by either an Ortho-Mode Transducer (OMT) 955 or a circulator 956. Since neither an OMT 955 nor a circulator 956 provides filtering it is necessary to include a transmit final filter 950 and receive initial filter 960.

Figure 10:
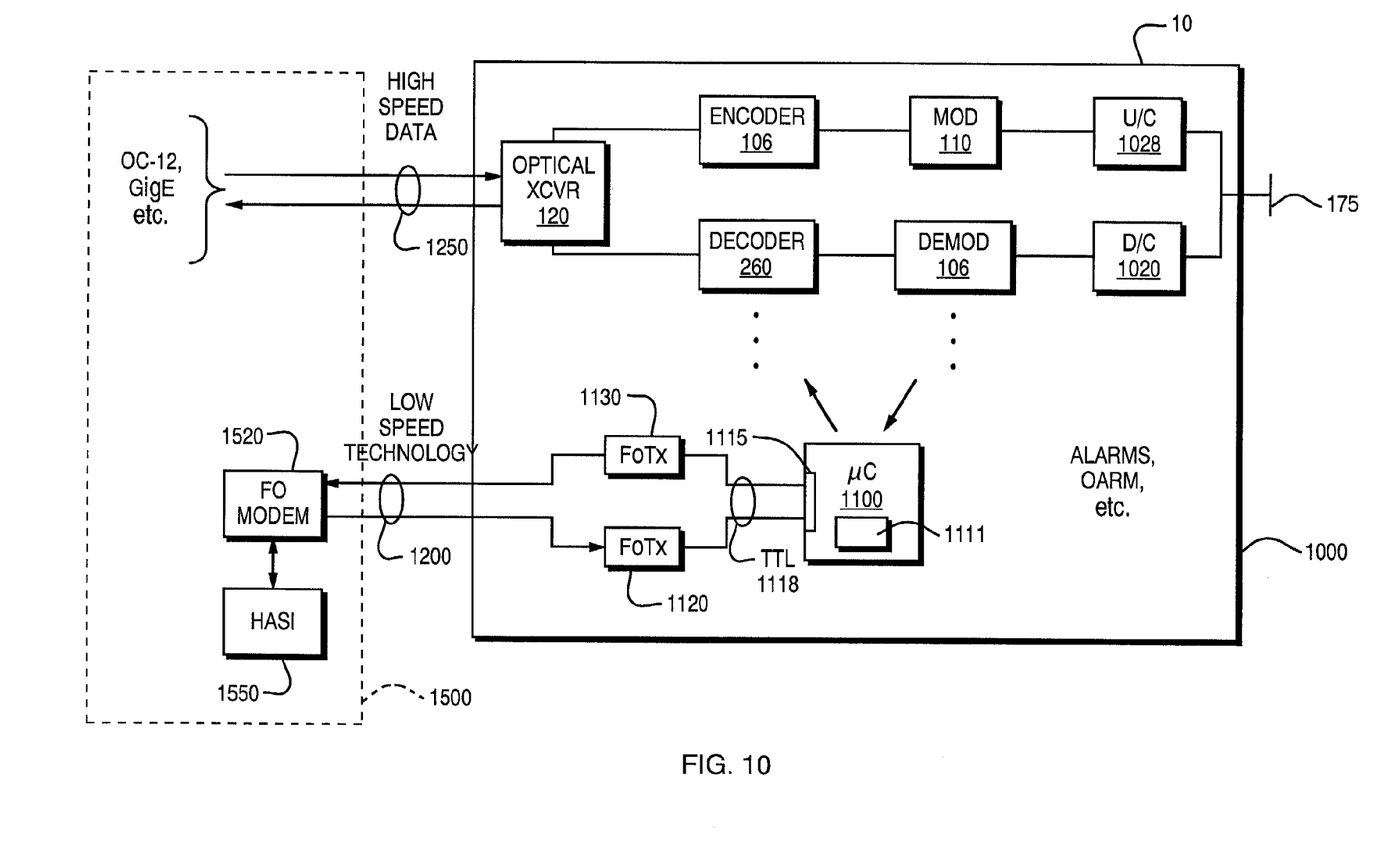
FIG. 10 is a block diagram illustrating an optical telemetry interface.

The invention can also provide a low speed telemetry interface for a point-to-point optical to microwave converter 10 using optical cables. FIG. 10 shows additional embellishments of the invention that might be used to provide a low data rate telemetry interface. Shown is a high level diagram of the radio related components that are associated with optical to microwave conversion of a high speed data signal. As previously described these include the optical transceiver 102, encoder 106, modulator 110 and up converter 102*a* (which includes for example the filter 126, mixer 128, oscillator 125, multiplier 127, filter 130 and amplifier 132 as well as down converter 1020, which include amplifiers 210, 224, filters 212, 230, mixer 220, multiplier 218 and oscillator 214 of FIG. 1), demodulator 240 and decoder 260.

One or more of the components of the converter 10 might provide alarm, status, or other signals relating to their operation and maintenance, or may accept configuration or programming signals. Such signals are provided to or from a microcontroller 1100 that is formed as part of the converter 10.

The converter 10 is typically located in an outdoor location that is remote from the data terminal equipment 1500 that provides the source optical (OC-12 or GigE type) signals that carry the high speed data 1250. When remotely located such as on a building roof top or on a tower, it is useful to provide a telemetry interface 1200 that permits a host computer 1550 associated with terminal equipment 1500 to control the converter 10. It is advantageous to provide this telemetry interface 1200 as a fiber optic low data rate interface. This avoids ground differential and over-voltage protection issues that might be associated with the typical copper wire (e.g, coaxial cable) interface.

More specifically, the remote located converter (or access unit 1000) includes an optical telemetry interface 1200 that uses a separate multimode fiber pair 1200 as a communications medium. The interface 1200 may carry asynchronous serial data, for example, to and from the access unit 1000 at a data rate of 57,600 bits per second in the common serial format of 8 data bits with no parity and one stop bit, such as using standard RS-232 signaling. The telemetry signaling typically includes remote control and monitoring of the access unit 1000 as well as the ability to perform upgrades of for example, firmware stored within an electrically erasable memory 1111 associated with the microcontroller 1100.

Fiber optic cables 1200 are chosen as a preferred transport medium for telemetry signals because they provide several key advantages that ultimately contribute to a more reliable unit 1000. These include elimination of electrostatic discharge, electromagnetic interference, effects radio frequency interference and similar susceptibility issues that would be inherent in the event a copper type RS-232 interface were used. In addition, ground loops that might be common with copper differential pair RS-422/RS-485 type interfaces are also avoided. The risk of lightning damage to 1100 also is reduced. An optical telemetry interface 1250 provides for a minimum parts count, and longer communication distances without the need to provide signal termination circuits.

In one embodiment, the access unit 1000 would include a hardware Universal Asynchronous Receiver/Transmitter (UART) 1115 which might be integral with the micro controller 1100. The UART provides the electrical functions for transmitting and receiving the telemetry signals. Since the UART operates with typically a five volt Transistor Transistor Logic (TTL) interface 1118, conversion to and from the optical is made with fiber optic transmitter 1130 and receiver 1120. The fiber optic transmitter 1130, which might be implemented with LED transmitter technology, transmits the TTL signal to an optical signal; the fiber optic receiver 1120 similarly transmits a received optical signal to a TTL signal.

At the host side, the fiber optic telemetry interface uses a commercial off-the-shelf RS-232 fiber optic modem 1520. Fiber optic modem 1520 can provide the translation of RS-232 electrical signals from the incoming low-speed telemetry received as optical signals and also converting electrical signals for transmission to optical form. In one embodiment, the telemetry messages are encoded using a 16 bit Cyclic Redundancy Check (CRC) to insure a high level of data integrity. Layered communication protocols may be used, as is well known in the art. For example, Simple Network Management Protocol (SNMP) messaging can be layered over the RS-232. Other sorts of protocols can be provided for. As an example, if 10baseT type signaling is used instead of RS-232 for the low data rate interface 1200. Internet Protocol (IP) type signaling could be used to carry the telemetry, with the access unit 100 having a dedicated IP address for this purpose.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for wireless transmission of high data rate optical signals comprising:

an electrical converter for converting a received optical signal containing a high data rate digital signal to a received electrical signal;

a clock and data recovery circuit for recovering the high data rate signal from the received electrical signal;

an encoder for encoding the high data rate signal as an encoded electrical signal;

a symbol modulator for modulating the encoded electrical signal to produce a Quadrature Amplitude Modulated (QAM) signal at an intermediate frequency (IF); and a microwave up converter for converting the QAM-IF signal to a single carrier microwave radio frequency carrier signal, and wherein the microwave up converter converts the QAM-IF signal to a millimeter wave signal at 20 Gigahertz or higher.

2. An apparatus for wireless transmission of high data rate optical signals comprising:
   an electrical converter for converting a received optical signal containing a high data rate digital signal to a received electrical signal;
   a clock and data recovery circuit for recovering the high data rate signal from the received electrical signal;
   an encoder for encoding the high data rate signal as an encoded electrical signal;
   a symbol modulator for modulating the encoded electrical signal to produce a Quadrature Amplitude Modulated (QAM) signal at an intermediate frequency (IF); and
   a microwave up converter for converting the QAM-IF signal to a single carrier microwave radio frequency carrier signal, and
   wherein the high data rate signal is a synchronized serial data stream containing higher level protocol layer information, such that the data recovery circuit, encoder, symbol modulator and microwave up converter are protocol independent and do not require further information concerning the received signal.

3. An apparatus for wireless transmission of high data rate optical signals comprising:
   an electrical converter for converting a received optical signal containing a high data rate digital signal to a received electrical signal;
   a clock and data recovery circuit for recovering the high data rate signal from the received electrical signal;
   an encoder for encoding the high data rate signal as an encoded electrical signal;
   a symbol modulator for modulating the encoded electrical signal to produce a Quadrature Amplitude Modulated (QAM) signal at an intermediate frequency (IF); and
   a microwave up converter for converting the QAM-IF signal to a single carrier microwave radio frequency carrier signal additionally comprising:
   a frequency multiplier, connected to the microwave up converter, for multiplying the microwave radio frequency carrier signal by a frequency multiplication factor.

4. An apparatus for wireless transmission of high data rate optical signals comprising:
   an electrical converter for converting a received optical signal containing a high data rate digital signal to a received electrical signal;
   a clock and data recovery circuit for recovering the high data rate signal from the received electrical signal;
   an encoder for encoding the high data rate signal as an encoded electrical signal;
   a symbol modulator for modulating the encoded electrical signal to produce a Quadrature Amplitude Modulated (QAM) signal at an intermediate frequency (IF); and
   a microwave up converter for converting the QAM-IF signal to a single carrier microwave radio frequency carrier signal, and further
   wherein a diplexer is used to couple the microwave radio frequency carrier signal to an antenna.

5. An apparatus for wireless transmission of high data rate optical signals comprising:
   an electrical converter for converting a received optical signal containing a high data rate digital signal to a received electrical signal;
   a clock and data recovery circuit for recovering the high data rate signal from the received electrical signal;
   an encoder for encoding the high data rate signal as an encoded electrical signal;
   a symbol modulator for modulating the encoded electrical signal to produce a Quadrature Amplitude Modulated (QAM) signal at an intermediate frequency (IF); and
   a microwave up converter for converting the QAM-IF signal to a single carrier microwave radio frequency carrier signal and further
   wherein an Ortho-Mode Transducer is used to couple the microwave radio frequency carrier signal to an antenna, and
   wherein a data rate of the received optical signal exceeds 100 megabits per second.

6. An apparatus for wireless transmission of high data rate optical signals comprising:
   an electrical converter for converting a received optical signal containing a high data rate digital signal to a received electrical signal;
   a clock and data recovery circuit for recovering the high data rate signal from the received electrical signal;
   an encoder for encoding the high data rate signal as an encoded electrical signal;
   a symbol modulator for modulating the encoded electrical signal to produce a Quadrature Amplitude Modulated (QAM) signal at an intermediate frequency (IF); and
   a microwave up converter for converting the QAM-IF signal to a single carrier microwave radio frequency carrier signal, and further
   wherein a circulator is used to couple the microwave radio frequency carrier signal to an antenna.

7. An apparatus for receiving a microwave frequency radio signal containing a high data rate digital signal and converting it to a wire transport signal comprising:
   a down converter for converting the microwave frequency signal to an intermediate frequency signal;
   a QAM symbol decoder for decoding the IF input into I and Q signals with the decoder including at least a pair of data recovery circuits to produce an I data signal representing inphase symbols at ½ the data rate and a Q data signal representing quadrature symbols at ½ the data rate;
   a parallel to serial converter for combining the I and Q data signals into a recovered data signal; and
   a wire transport converter for converting the recovered data signal to a transport signal format wherein the QAM symbol decoder is a known non-coherent symbol decoder.

8. An apparatus as in claim 1 or 2 wherein the data rate of the received optical signal exceeds 100 megabits per second.

9. An apparatus as in claim 1 or 2 wherein the QAM signal is a Quadrature phase shift keying (QPSK) signal.

10. An apparatus as in claim 1 or 2 wherein the QAM signal is a differential Quadrature phase shift keying (DQPSK) signal.

11. An apparatus as in claim 1 or 2 wherein the received optical signal originates as a SONET signal.

12. An apparatus as in claim 1 or 2 wherein a received optical signal is a Gigabit Ethernet signal.

13. An apparatus as in claim 1 or 2 wherein the received optical signal is a Fibre Channel signal.

14. An apparatus as in claim 1 or 2 wherein the microwave up converter uses a heterodyne conversion.

15. An apparatus as in claim 1 or 2 wherein the microwave up converter uses direct modulation.

16. An apparatus as in claim 1 or 2 additionally comprising:

one or more power amplifiers coupled to amplify the microwave radio frequency carrier signal.

17. An apparatus as in claim 1 or 2 wherein a common local oscillator is used to drive the microwave up converter and a microwave down converter.

18. An apparatus as in claim 1 or 2 wherein an optical telemetry interface is used to carry telemetry signals to and from the electrical converter.

19. An apparatus as in claim 18 wherein the optical telemetry interface uses a different optical fiber than a fiber that carries the received optical signal.

20. An apparatus as in claim 3 wherein the symbol modulator additionally comprises:
   a plurality of phase splitters, connected to receive the encoded electrical signal, and to impact one of a set of phase shifts that are activated according to the frequency multiplication factor.

21. An apparatus as in claim 7 wherein the QAM symbol decoder is a clock and data recovery device used for optical signal recovery.

22. An apparatus as in claim 21 wherein a third clock and data recovery circuit is used to re-time the recovered data signal.

23. An apparatus as in claim 22 wherein the phase demodulator uses a pair of base delays of +45° and −45° to eliminate the QPSK symbol decoder ambiguities.

24. An apparatus as in claim 7 wherein the QAM symbol decoder performs differential QAM (DQAM) demodulation.

25. An apparatus as in claim 24 wherein the DQAM demodulation is DQPSK.

26. An apparatus as in claim 7 wherein the transport signal is an optical signal.

27. An apparatus as in claim 26 wherein the transport signal is selected from the group consisting of Sonet, Gigabit Ethernet or Fiber Channel.

28. An apparatus as in claim 7 wherein the transport signal is a Gigabit Ethernet electrical signal.

* * * * *